(12) United States Patent
Ohta (10) Patent No.: US 11,282,222 B2
(45) Date of Patent: Mar. 22, 2022

(54) RECORDING MEDIUM, OBJECT DETECTION APPARATUS, OBJECT DETECTION METHOD, AND OBJECT DETECTION SYSTEM

(71) Applicant: SQUARE ENIX CO., LTD., Tokyo (JP)

(72) Inventor: Isao Ohta, Tokyo (JP)

(73) Assignee: SQUARE ENIX CO., LTD., Tokyo (JP)

( * ) Notice: Subject to any disclaimer, the term of this patent is extended or adjusted under 35 U.S.C. 154(b) by 99 days.

(21) Appl. No.: 16/898,335

(22) Filed: Jun. 10, 2020

(65) Prior Publication Data
US 2021/0019900 A1    Jan. 21, 2021

(30) Foreign Application Priority Data
Jul. 19, 2019    (JP) .............................. JP2019-133856

(51) Int. Cl.
```
G06T 7/00       (2017.01)
G06T 7/579      (2017.01)
A63F 13/45      (2014.01)
A63F 13/213     (2014.01)
G06T 7/73       (2017.01)
```
(52) U.S. Cl.
CPC ............ *G06T 7/579* (2017.01); *A63F 13/213* (2014.09); *A63F 13/45* (2014.09); *G06T 7/73* (2017.01); *G06T 2207/10028* (2013.01)

(58) Field of Classification Search
None
See application file for complete search history.

(56) References Cited

U.S. PATENT DOCUMENTS

2018/0364717 A1 * 12/2018 Douillard ........... G06K 9/00791

FOREIGN PATENT DOCUMENTS

| JP | 2012528398 A | 11/2012 |
| WO | 2010138582 A2 | 12/2010 |

OTHER PUBLICATIONS

A 3-D Modeling System Using Hands Gesture. Ishii et al. (Year: 2011).*
Japanese Office Action dated Mar. 26, 2021, Japanese Patent Application No. 2019-133856 and English translation thereof.
(Continued)

*Primary Examiner* — Delomia L Gilliard
(74) *Attorney, Agent, or Firm* — Dorsey & Whitney LLP (57) ABSTRACT

An apparatus comprises: acquiring depth information regarding an object that is present in a real space, the depth information indicating a distribution of distances to points on a surface of the object in a depth direction relative to a position; developing the points on the surface of the object, within a three-dimensional space that corresponds to the real space, based on the depth information; classifying the developed points on the surface of the object into any of a plurality of cells of a volume grid, divided from the three-dimensional space and each having a predetermined size; and determining, as a space in which the object is present, a space of the three-dimensional space and corresponding to cells into which a greater number of points on the surface of the object than a threshold value are classified.

7 Claims, 6 Drawing Sheets

(56) References Cited

OTHER PUBLICATIONS

"A 3-D Modeling System Using Hands Gesture," Journal of the Institute of Image Information and Television Engineers, The Institute of Image Information and Television Engineers, vol. 65 No. 6, Jun. 1, 2011.
Office Action for JP Application No. JP2019-133856, dated Aug. 7, 2020.

* cited by examiner

RECORDING MEDIUM, OBJECT DETECTION APPARATUS, OBJECT DETECTION METHOD, AND OBJECT DETECTION SYSTEM

CROSS-REFERENCE TO RELATED APPLICATION(S)

This application claims priority to and the benefit of Japanese Patent Application No. 2019-133856 filed on Jul. 19, 2019, the entire disclosure of which is incorporated herein by reference.

BACKGROUND OF THE INVENTION

Field of the Invention

The present invention relates to a recording medium, an object detection apparatus, an object detection method, and an object detection system, and in particular to a technology for performing determination regarding object detection based on the distribution of distances in a depth direction.

Description of the Related Art

In recent years, in the field of computer graphics (CG) for movies, electronic games, and so on, a method for measuring human body expressions using a motion tracking system and adopting such expressions as the motion of a character model has been adopted in order to provide more natural rendering. However, such motion tracking systems generally require a large-scale space and apparatuses. Therefore, it is not realistic to employ such a system as a measurement apparatus for games played using a home game console in a case where the results of measurement of the player's body expressions are used to perform CG control in real-time, for example.

In this regard, Japanese Patent Laid-Open No. 2012-528398 discloses a technology for making it possible to use the player's body expressions to perform CG control in real-time in such a case, with a small-scale apparatus configuration using a capture device that includes a 3D camera that can acquire depth information that indicates the distribution of distances in the depth direction.

According to the technology disclosed in Japanese Patent Laid-Open No. 2012-528398, human body expressions are detected through image analysis, using the capture device, to estimate the state of joints and the state of the skeleton of the human body, and the results of estimation are used to perform CG control. However, such estimation requires a relatively large amount of computation. For example, if such estimation is realized in a home game console in parallel with various kinds of rendering processing, the amount of a computational resource for other processing may become insufficient.

SUMMARY OF THE INVENTION

The present invention in its first aspect provides a non-transitory computer-readable recording medium on which a program is recorded, the program causing a computer to carry out: processing through which depth information regarding an object that is present in a real space is acquired, the depth information indicating a distribution of distances to points on a surface of the object in a depth direction relative to a predetermined position; processing through which the points on the surface of the object are developed within a three-dimensional space that corresponds to the real space, based on the acquired depth information; processing through which the developed points on the surface of the object are classified into any of a plurality of cells of a volume grid, divided from the three-dimensional space and each having a predetermined size; and processing through which a space included in the three-dimensional space and corresponding to cells into which a greater number of points on the surface of the object than a predetermined threshold value are classified is determined as a space in which the object is present.

The present invention in its second aspect provides an object detection apparatus comprising: an acquisition unit that acquires depth information regarding an object that is present in a real space, the depth information indicating a distribution of distances to points on a surface of the object in a depth direction relative to a predetermined position; a developing unit that develops the points on the surface of the object, within a three-dimensional space that corresponds to the real space, based on the depth information acquired by the acquisition unit; a classification unit that classifies the points on the surface of the object, developed by the developing unit, into any of a plurality of cells of a volume grid, divided from the three-dimensional space and each having a predetermined size; and a determination unit that determines, as a space in which the object is present, a space included in the three-dimensional space and corresponding to cells into which a greater number of points on the surface of the object than a predetermined threshold value are classified by the classification unit.

The present invention in its third aspect provides an object detection method comprising: an acquisition step in which depth information regarding an object that is present in a real space is acquired, the depth information indicating a distribution of distances to points on a surface of the object in a depth direction relative to a predetermined position; a developing step in which the points on the surface of the object are developed within a three-dimensional space that corresponds to the real space, based on the depth information acquired in the acquisition step; a classification step in which the points on the surface of the object, developed in the developing step, are classified into any of a plurality of cells of a volume grid, divided from the three-dimensional space and each having a predetermined size; and a determination step in which a space included in the three-dimensional space and corresponding to cells into which a greater number of points on the surface of the object than a predetermined threshold value are classified in the classification step is determined as a space in which the object is present.

The present invention in its fourth aspect provides an object detection system that includes a measurement apparatus that measures, regarding an object that is present in a real space, distances to points on a surface of the object in a depth direction relative to a predetermined position, and an object detection apparatus that performs determination regarding detection of an object that is present in the real space, based on results of measurement performed by the measurement apparatus, the object detection apparatus comprising: an acquisition unit that acquires depth information that indicates a distribution of the distances from the measurement apparatus to the points on the surface of the object; a developing unit that develops the points on the surface of the object, within a three-dimensional space that corresponds to the real space, based on the depth information acquired by the acquisition unit; a classification unit that classifies the points on the surface of the object, developed by the developing unit, into any of a plurality of cells of a volume grid, divided from the three-dimensional space and each having a predetermined size; and a determination unit that determines, as a space in which the object is present, a space included in the three-dimensional space and corresponding to cells into which a greater number of points on the surface of the object than a predetermined threshold value are classified by the classification unit.

DESCRIPTION OF THE EMBODIMENTS

Embodiments

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

The embodiments below describe an example in which the present invention is applied to a PC that is an example of an object detection apparatus and is configured to acquire depth information that indicates, regarding an object that is present in a real space, the distribution of distances to points on the surface of the object in a depth direction with reference to a predetermined position. However, the present invention is applicable to any apparatus that can perform determination regarding object detection based on the depth information.

Configuration of Object Detection System

Figure 1:
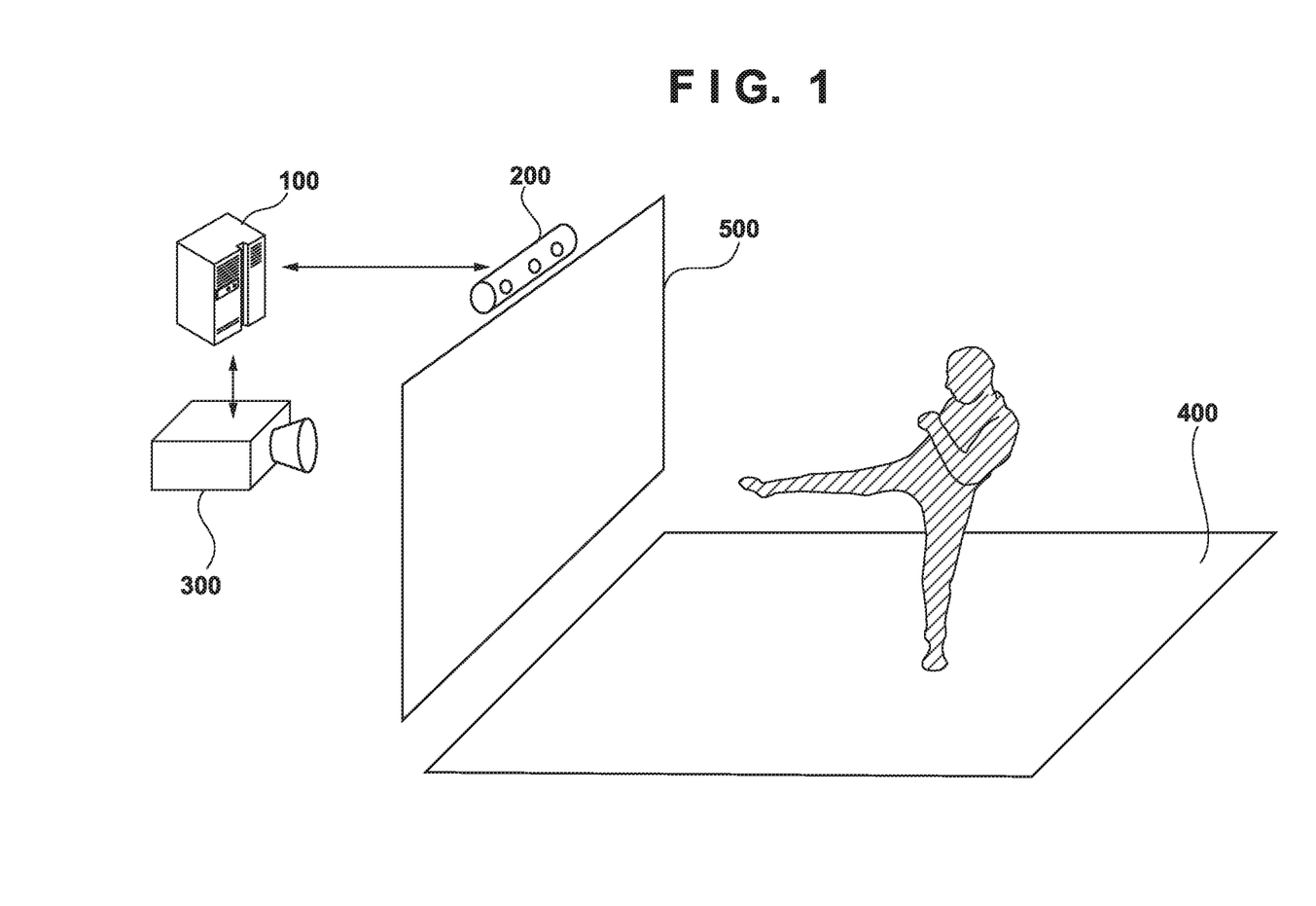
FIG. 1 is a diagram showing a configuration of an object detection system according to an embodiment of the present invention.

FIG. 1 is a system diagram showing a configuration of an object detection system according to the present embodiment.

As shown in FIG. 1, the object detection system according to the present embodiment includes a PC 100 that executes processing to provide the experience of playing a game, which is content that utilizes the results of object detection, a field (a play field) 400 on which a player plays a game, a projector 300 that presents (projects) an image (a game screen) related to a game, generated by the PC 100, onto a screen 500 that is provided in front of the player, and a depth sensor 200 that can detect the distance of the player on the field 400 in a depth direction. Although the experience of playing any kind of game may be provided by the PC 100, the game in the present embodiment is composed so as to progress using gestures made by the player with their body and hands on the field 400, as operational inputs.

The display surface of the screen 500 is provided so as to directly face the player when the player faces toward the front side defined for the field 400. The depth sensor 200 is provide on a top part of the screen 500, and measures a distance in a depth direction, which is the normal direction of the display surface of the screen 500. The depth sensor 200 may include, for example, a projection device that projects infrared light in a specific pattern, and two capturing devices that are arranged so as to have a positional relationship with a parallax, and capture images of an object onto which the pattern is projected, and the depth sensor 200 may be configured to derive information regarding a distance in the depth direction by performing stereo matching on the two captured images, and output such information as depth information.

The distance to the object (e.g. the player) on the field 400 in the depth direction may be derived regarding a measurement target range in the real space, as a distance from the lens principle point (not shown) of one capturing device of the depth sensor 200, for example. Depth information is composed as two-dimensional information that has the same degree of resolution as the captured images. Regarding each pixel of a captured image acquired by one reference capturing device, the distance to the surface of the subject shown in the pixel (the distance to the position on the subject corresponding to the pixel) is stored as a pixel value of depth information at the position (two-dimensional position). That is to say; when an image of a measurement target range is captured by an capturing device of the depth sensor 200, each pixel of depth information indicates the distance to the surface of the subject at the position of the pixel of the captured image, and thus depth information indicates, as a whole, the distribution of distances to the points on the surfaces within the measurement target range.

Although the depth sensor 200 in the present embodiment is configured to be able to solely perform computations to derive distances based on an image and output depth information, the present invention is not limited to being carried out in such a manner. That is to say, according to the present invention, any device that performs processing related to object detection may be able to acquire depth information, and computations related to distance derivation may be performed by such a device.

Also, although the object detection system according to the present embodiment is constituted by the PC 100, the depth sensor 200, the projector 300, the field 400, and the screen 500, the object detection system may be separated into components in any manner. For example, unlike the above description, the game screen is not necessarily displayed by the projector 300 projecting it onto the screen 500, and the measurement related to composition of depth information is not necessarily performed by the depth sensor 200 provided on a top part of the screen 500. Also, regarding processing and processes performed solely by the PC 100 above in order to carry out the present invention, the object detection system may be configured such that such processing and processes are performed by a plurality of devices that cooperate with each other, in a distributed manner.

Functional Configuration of PC 100

Figure 2:
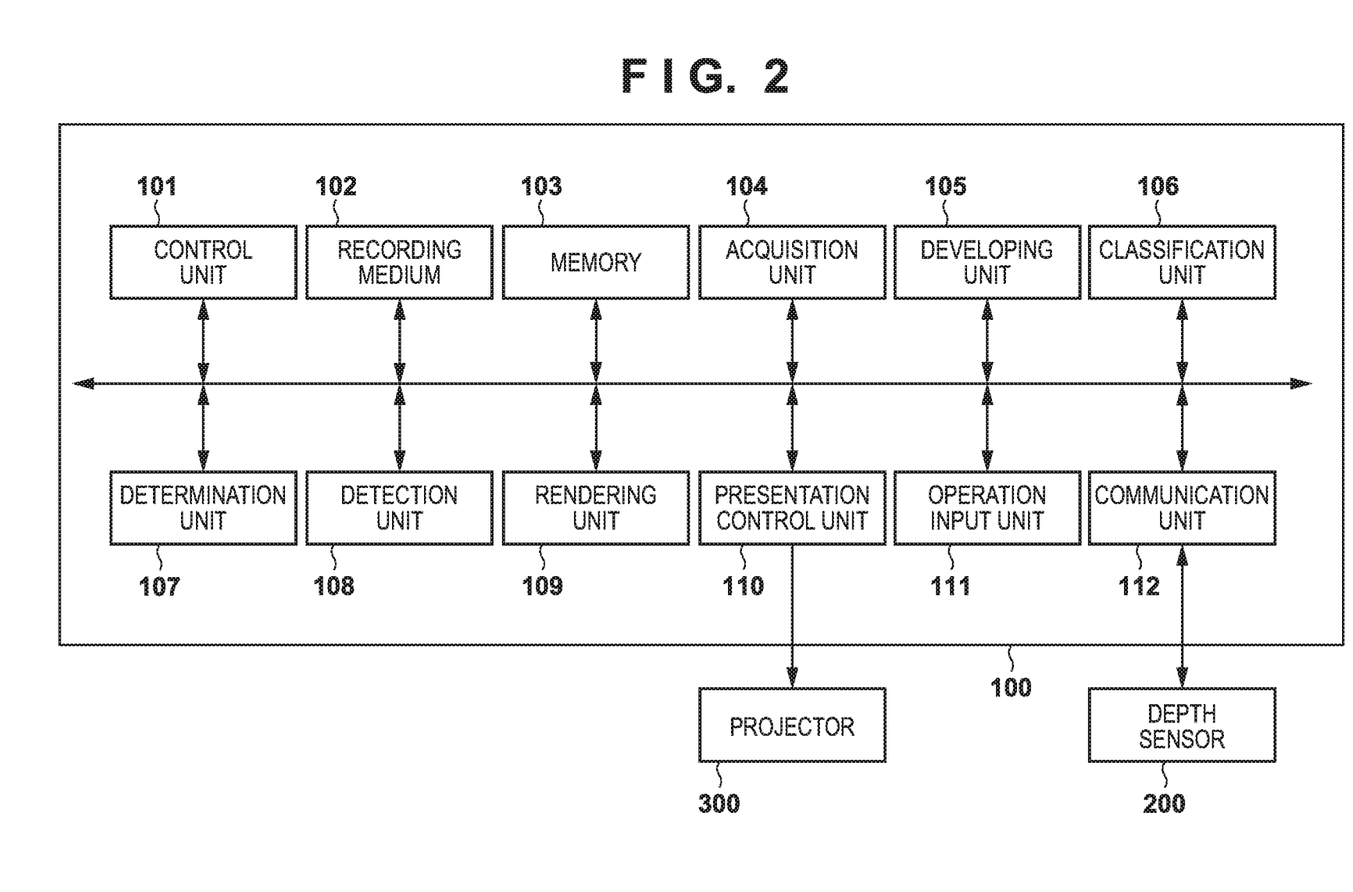
FIG. 2 is a block diagram showing a functional configuration of a PC 100 according to the embodiment of the present invention.

The following describes a functional configuration of the PC 100 in detail with reference to the block diagram in FIG. 2.

A control unit 101 is, for example, a CPU, and controls operations of each block of the PC 100. The control unit 101 controls for each block by reading out an operational program for the block stored on a recording medium 102, loading the program onto a memory 103, and executing the program.

The recording medium 102 is a non-volatile recording device such as a rewritable built-in ROM of the PC 100, or an optical disc that can be read via an HDD or an optical drive. The recording medium 102 records not only operational programs for the blocks, but also information such as various parameters that are necessary for the blocks to operate. In the object detection system according to the present embodiment, various kinds of data related to a game are also stored on the recording medium 102. The memory 103 is, for example, a volatile memory, and is used not only as an area onto which operational programs for the blocks are to be loaded, but also as a storage area for temporarily storing intermediate data or the like output during the operations of the blocks.

An acquisition unit 104 acquires depth information that is composed based on the results of measurement performed by the depth sensor 200 regarding the field 400, and stores the information in the memory 103. In the object detection system according to the present embodiment, the depth sensor 200 is configured to intermittently perform imaae capturing for measurement, and generate and output depth information each time.

A developing unit 105 develops depth information acquired by the acquisition unit 104 into three-dimensional space information. As described above, depth information indicates the distribution of distances to the surface of an object in a depth direction with reference to the position of the depth sensor 200, regarding a measurement target range. The reference position may be the position of the principle point of a lens (an capturing optical system) of the capturing device of the depth sensor 200, for example. As in the present embodiment, when the depth sensor 200 derives distances in the depth direction according to a stereo matching method using two capturing devices, the distances to the object that is present in a light ray direction from the positions of the pixels of the captured image are stored as depth information. In other words, depth information may be two-dimensional information that has the same pixel structure as the captured image on which distance derivation is based, and a value that is to be stored in a given pixel of depth information is a distance to the subject shown in the pixel of the captured image at the same position, in the depth direction.

Therefore, the developing unit 105 can develop the point cloud of an object that is present in the measurement target range, within a three-dimensional space for detection, by arranging, based on the distance value of each pixel stored in depth information, the detected points on the surface of the object in a three-dimensional coordinate system that is separated in a direction corresponding to the pixel by a distance corresponding to the distance value. Thus, the developing unit 105 can convert depth information into three-dimensional information.

Figure 3:
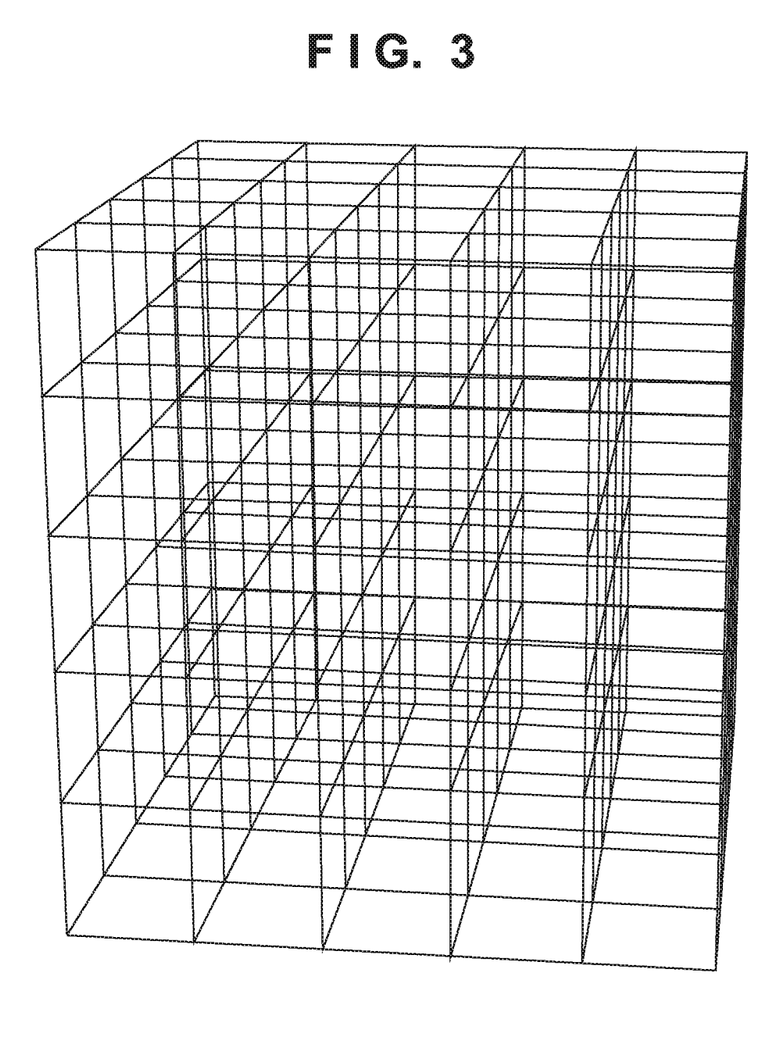
FIG. 3 is a diagram illustrating a volume grid for the object detection system according to the embodiment of the present invention, which defines a three-dimensional space in which a point cloud that is based on depth information is developed.

A classification unit 106 classifies the points of the point cloud that are related to the surface of the object that is present in the measurement target range and have been developed by the developing unit 105 within the three-dimensional space, according to the positions thereof in the three-dimensional space. With the object detection system according to the present embodiment, the three-dimensional space for detection is divided into cells of a volume grid that each have a predetermined size as shown in FIG. 3, and the classification unit 106 classifies the points into any of the cells of the volume grid. The volume grid defined regarding the three-dimensional space for detection may be configured as a cube, for example, and the range of coordinates of the volume grid are known in advance. The classification unit 106 classifies the points developed within the three-dimensional space, into any of the cells of the volume grid based on information regarding the range of coordinates.

Figure 4A:
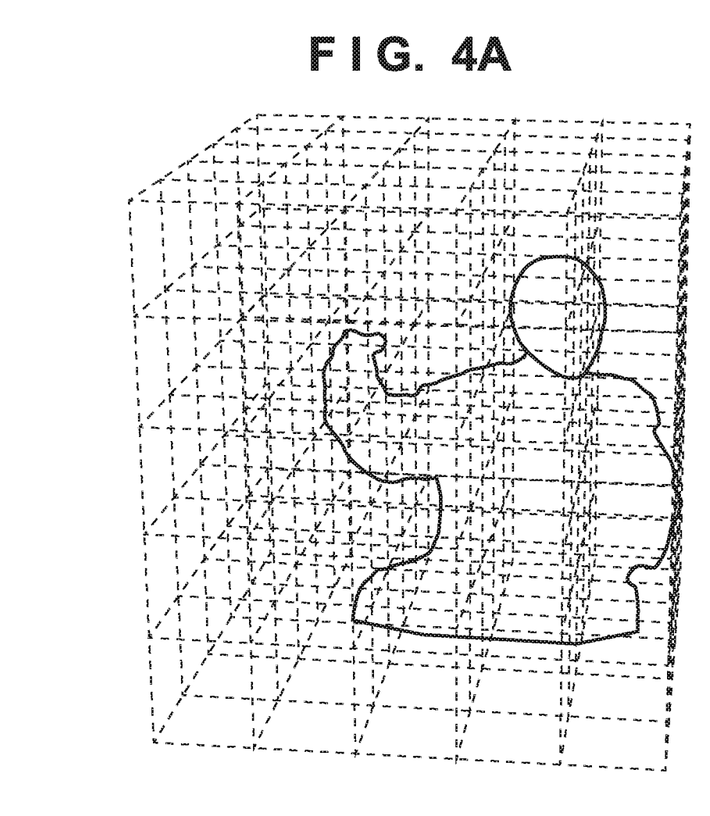
FIGS. 4A and 4B are diagrams each showing the distribution of the cells of a volume grid for the object detection system according to the embodiment of the present invention, determined as spaces in which an object is present.
Figure 4B:
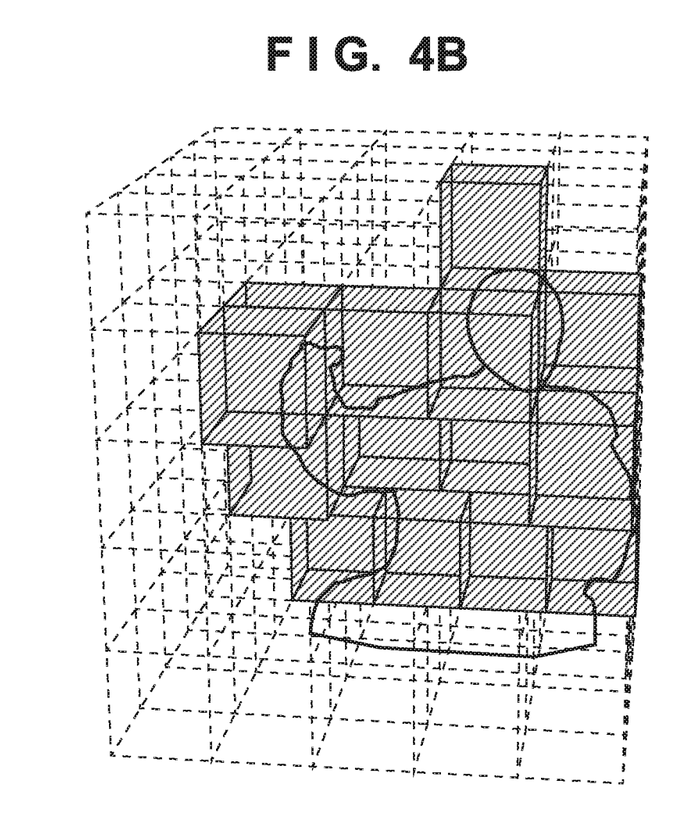

A determination unit 107 determines a space (a volume grid) in which that object in the measurement target range is present, based on the results of classification performed by the classification unit 106. In the present embodiment, the determination unit 107 determines that an object is present in a given cell of the volume grid if the number of points classified into the given cell is greater than a predetermined threshold. As a result, if the points are distributed as shown in FIG. 4A, for example, the cells of the volume grid hatched in FIG. 4B are determined as spaces in which the object is present.

A detection unit 108 detects body expressions such as specific gestures made by the player with their body and hands on the field 400 (motion detection), to reflect the body, expressions, as operational inputs, to the game of which play experience is provided by the object detection system according to the present embodiment. In a mode where the state of joints and the state of the skeleton of the human body are estimated through image analysis and are used for the purpose of control as disclosed in Japanese Patent Laid-Open No. 2012-528398, the amount of computation is large and the detection of operation inputs may cause a shortage of a computational resource or hinder the progress of the game. Therefore, the object detection system according to the present embodiment employs a method thorough which the detection unit 108 performs simple motion detection based on a change in the results of determination performed by the determination unit 107.

More specifically, the detection unit 108 detects a body expression of the player based on the distribution, changed over time, of the cells of the volume grid determined as cells in which the object is present. For example, if a volume grid divided into one (vertical)×six (horizontal) cells is defined, and the distribution changes over time as follows, the detection unit 108 can detect the motion of the player along the trajectory indicated by the circles (○):

Time 1: ○xxxxx
Time 2: x○xxxx
Time 3: xx○xxx where each circle (○) indicates a cell of a volume grid determined as a cell in which the object is present, and each cross (x) indicates a cell of a volume grid determined as a cell in which the object is not present. Therefore, for example, the memory 103 is configured to store the distribution of the cells of the volume grid determined by the determination unit 107 as cells in which the object is present, in association with time stamps that identify time, and hold the distribution for a predetermined period.

In order to simplify a description, the present embodiment describes an example in which the detection unit 108 detects the moving body based on a temporal transition as described above. However, detection may be performed in any manner as long as detection is performed based on how the cells of the volume grid determined as cells in which the object is present change. For example, the moving body may be determined based on a change in the number of points on the surface of the object included in the cells of the volume grid determined as cells in which the object is present.

Also, although the present embodiment describes a case in which the detection unit 108 detects the player as a moving body on the field 400, it would be easily understood that a moving body that can be detected according to the present method is not limited to a player. That is to say, according to the present method, cells of the volume grid in which no less than a predetermined number (threshold value) of points of the point cloud developed within a three-dimensional space based on depth information are present are determined as cells in which the object is present, and it is possible to determine the presence or absence of an object other than a human body by changing the size of the volume grid and the threshold values. Therefore, it is possible to determine the presence of any object, such as a tool or a piece of cloth held by the player, and detect the motion of the object using the detection unit 108, only if it is possible to determine the distance to the object using the depth sensor 200. As a result, it is possible to perform motion detection through simple calculations without performing the estimation disclosed in Japanese Patent Laid-Open No. 2012-528398, for example.

A rendering unit 109 is a rendering device such as a GPU, and renders and generates a game screen that is to be presented on the screen 500, based on the progress of a cenesthesic game or the results of detection of operational inputs that are based on body expressions. Upon generating a game screen, the rendering unit 109 transmits the game screen to a presentation control unit 110.

The presentation control unit 110 is an interface that outputs a game screen generated by the rendering unit 109 to the projector 300. As a result of the presentation control unit 110 outputting a game screen to the projector 300, the game screen is displayed on the screen 500.

An operation input unit 111 is a user interface that the PC 100 has, such as a controller or a mouse. Upon detecting an operational input from the user of the PC 100, or an operational input from the player, related to the start of game play, the operation input unit 111 outputs a control signal corresponding to the operational input to the control unit 101. Note that, in the object detection system according to the present embodiment, operational inputs are not made via the user interface related to the operation input unit 111 during game play, but are made by detecting the player's body expressions. The user interface related to the operation input unit 111 is used to start a game or to input other instructions.

A communication unit 112 is a communication interface that the PC 100 has, and is used to perform communication with another device. The communication unit 112 communicates with the depth sensor 200, for example, using a predetermined communication method, which is wireless or wired, to perform data transmission and reception.

Game Content

Figure 5:
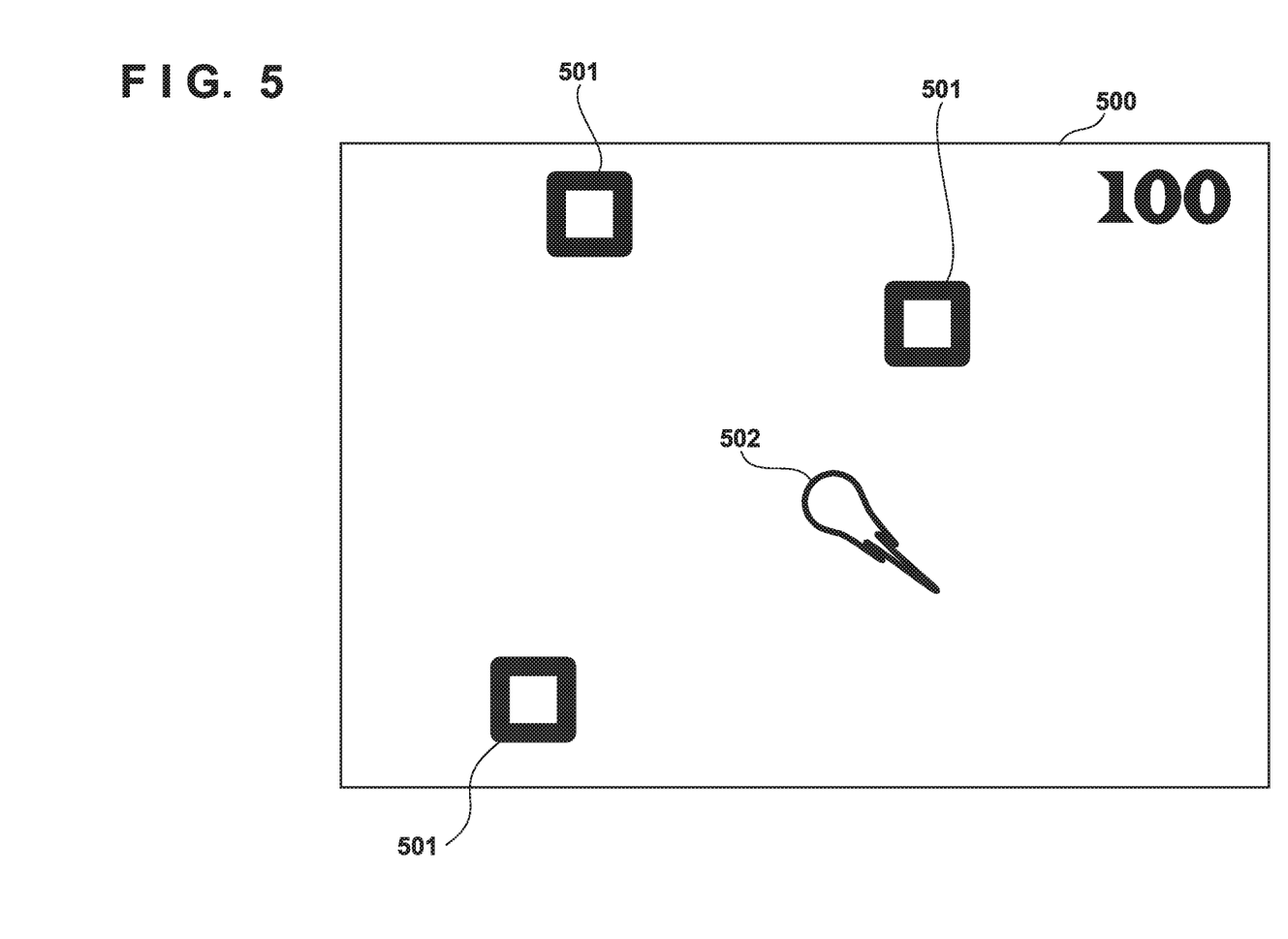
FIG. 5 is a diagram showing an example of a game screen displayed on a screen 500 according to the embodiment of the present invention.

The game provided by the object detection system according to the present embodiment is composed such that the user can acquire a predetermined score by destroying objects (obstacle objects) 501 flying from a given side of the game screen, as shown in FIG. 5, for example. As described above, the game screen is presented by being projected onto the screen 500 that is provided so as to directly face the player on the field 400. The game screen may include not only the obstacle objects 501 but also an object (a remover object) 502 that two-dimensionally shows the trajectory of the moving body detected for the player, a score, and effects.

The player can let the detection unit 108 detect any part of their body on the screen 500 as a moving body by moving said body part, and thus can move the remover object 502 in the game screen according to the position of the detected moving body. More specifically, the position of the remover object 502 in the game screen presented on the screen 500 has a mirror image relationship when seen from the player on the field 400, and the user can easily check the position and the moving direction of the body part that the user moves while performing an operation. The player moves the remover object 502 according to the position of an obstacle object 501 on the game screen and hits the obstacle object 501 with the remover object 502, and thus the player can destroy the obstacle object 501.

Play Provision Processing

Figure 6:
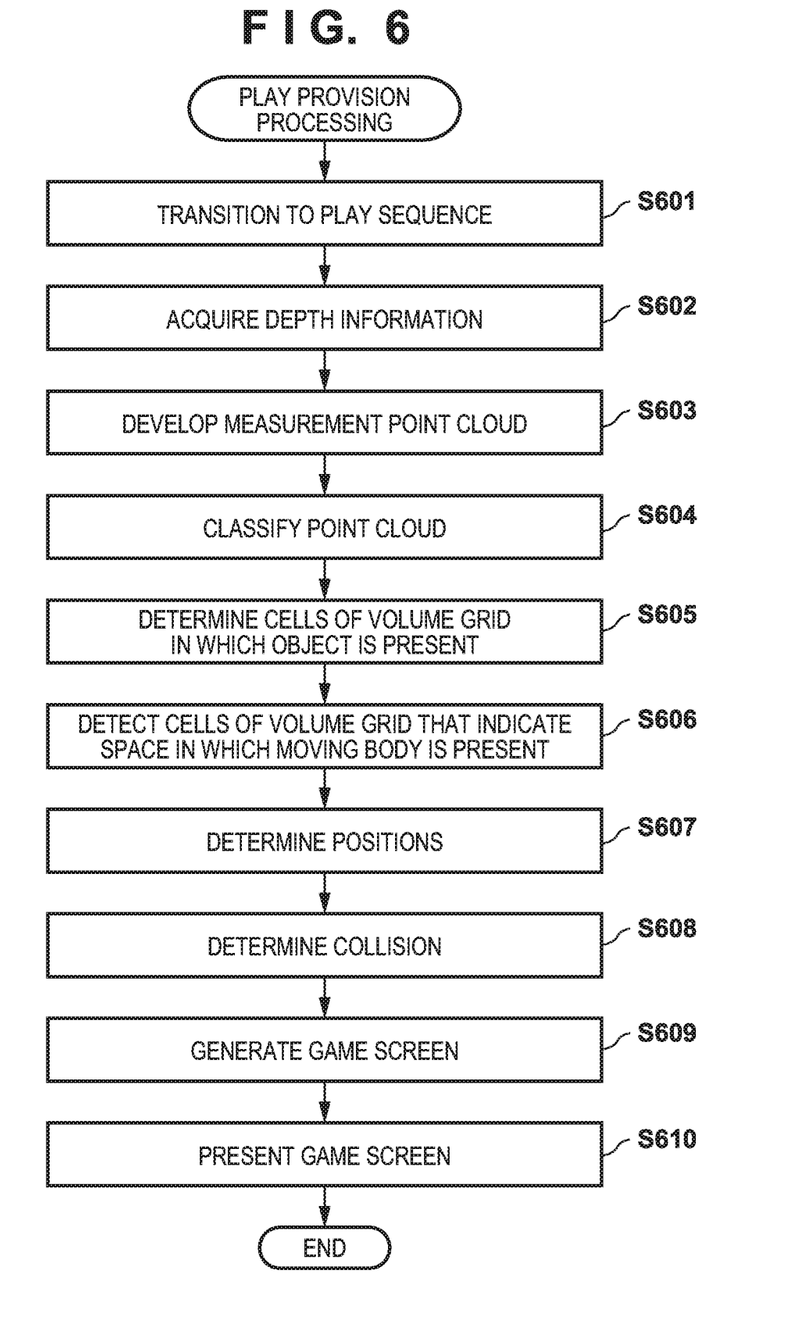
FIG. 6 is a flowchart showing an example of play provision processing executed by a PC 100 according to the embodiment of the present invention.

The following specifically describes play provision processing performed by the object detection system according to the present embodiment with the above-described configuration to provide one instance of game play with reference to the flowchart in FIG. 6. The processing corresponding to the flowchart is realized by the control unit 101 reading out a relevant processing program stored in the recording medium 102, loading the program onto the memory 103, and executing the program, for example. Note that this play provision processing is started upon an operational input related to a game play start request being made, and is repeated during the game play, for example.

In step S601, the control unit 101 performs processing related to the game, and transitions to a state in which the control unit 101 can provide game play on the field 400. Upon starting the processing related to the game, the control unit 101 transitions to a play sequence for providing game play after going through a predetermined preparation sequence. In the following description, the play sequence is a sequence in which control is performed such that processing related to the arrangement of an obstacle object that flies into a game screen, a removable object, effects, and so on is performed for each frame, the rendering unit 109 generates a game screen, the presentation control unit 110 transmits the generated game screen to the projector 300 so as to be presented on the screen 500, unless otherwise specified. As a result, it is possible to realize game play on the field 400.

In step S602, the acquisition unit 104 acquires depth information, which is the result of sensing performed by the depth sensor 200 on the current field 400, under the control of the control unit 101.

In step S603, the developing unit 105 develops the point cloud subjected to depth measurement, in a three-dimensional space, based on the depth information acquired in step S602, under the control of the control unit 101. More specifically, the developing unit 105 develops the point cloud by converting depth values that are stored in the pixels of depth information based on information regarding the optical system of the depth sensor 200, into coordinate values in the three-dimensional space.

In step S604, the classification unit 106 classifies the points developed in the three-dimensional space in step S603, into any of the cells of the volume grid, divided from the three-dimensional space and each having a predetermined size, under the control of the control unit 101. Classification may be performed based on three-dimensional coordinates and information regarding the range of coordinates indicated by the volume grid.

In step S605, the determination unit 107 determines the cells of the volume grid in which the object is present, based on the result of classification in S604, under the control of control unit 101. The information regarding the results of determination are stored in the memory 103 in association with a time identifier that indicates the frame on which the determination was performed, and a time stamp.

In step S606, the detection unit 108 detects the cells of the volume grid that indicate the space in which the moving body is present, under the control of the control unit 101, based on the history of the distribution of cells of the volume grid determined as a space in which the object was present. The detection unit 108 converts the results of detection of cells of the volume grid related to the moving body, into two-dimensional coordinate information indicating coordinates an the game screen, and stores the information in the memory 103. Also, the detection unit 108 updates trajectory information that is necessary for rendering the remover object, based on the results of detection (which may indicate coordinates on the game screen) of the cells of the volume grid related to the moving body. Trajectory information may be stored in the memory 103, for example, and is referenced when a game screen is to be rendered.

In step S607, the control unit 101 determines the positions of the obstacle objects that are to be displayed next in the game screen presented on the screen 500, according to an obstacle object arrangement rule. A flight trajectory is determined for each of the obstacle objects to be arranged, and therefore the position at which each obstacle object is to be arranged can be basically determined based on the elapsed time.

In step S608, the control unit 101 performs collision determination to determine whether or not an obstacle object and a remover object arranged in the game screen have collided with each other. The collision determination is performed for the game screen to be presented, based on, for example, information regarding the arrangement position of the obstacle object determined in step S607 and two-dimensional coordinate information regarding the results of detection of the cells of the volume grid related to the moving body derived in step S606, in order to determine whether or not the objects collide with each other in a case where a collision area of a predetermined size is defined for each object. The control unit 101 stores the result of collision determination in the memory 103, and performs processing to determine whether or not effects are to be displayed on the game screen, update the score, and cancel the arrangement of the collided obstacle object, for example.

In step S609, the rendering unit 109 generates a game screen that is to be presented next, under the control of the control unit 101, based on information regarding the determined arrangement of obstacle objects and the remover object.

In step S610, the presentation control unit 110 transmits the game screen generated in step S609 to the projector 300 under the control of the control unit 101, so that the game screen is presented on the screen 500.

As described above, the object detection system according to the present embodiment can desirably detect body expressions through a small amount of computation. More specifically, the object detection system develops a point cloud on the surface of an object, which is based on depth information, in a three-dimensional space, and determine a space (cells of a volume grid) in which the object is present, based on the distribution of the points of the point cloud, without the need to perform computations to estimate the state of joints or the state of the skeleton of a human body. Furthermore, the object detection system specifies a space in which the object is present, and thereafter detects the movement of an object based on how the space changes. Therefore, it is possible to reduce the amount of computation required for moving body detection.

The invention is not limited to the foregoing embodiments, and various variations/changes are possible within the spirit of the invention.

What is claimed is:

1. A non-transitory computer-readable recording medium on which a program is recorded, the program causing a computer to carry out:
   obtaining depth information regarding an object that is present in a real space, the depth information indicating a distribution of distances to points on a surface of the object in a depth direction relative to a predetermined position;
   developing the points on the surface of the object within a three-dimensional space that corresponds to the real space, based on the depth information;
   classifying the developed points on the surface of the object into any of a plurality of cells of a volume grid, the plurality of cells being divided from the three-dimensional space and each cell of the plurality of cells having a predetermined size; and
   determining a space in the three-dimensional space that corresponds to cells among the plurality of cells, each cell including a greater number of classified points on the surface of the object than a predetermined threshold value, as a space in which the object is present; and
   detecting movement of the object according to a change in the number of points on the surface of the object included in each cell of the cells of the volume grid corresponding to the space in which the object is present.

2. The recording medium according to claim 1, wherein the depth information is intermittently obtained.

3. The recording medium according to claim 2, wherein the movement of the object is detected according to a change in the distribution, within the three-dimensional space, of the space determined as a space in which the object is present.

4. The recording medium according to claim 1, wherein the program further causes the computer to carry out controlling progress of a game based on the distribution.

5. An object detection apparatus comprising:
   a recording medium configured to store a program; and
   a controller configured to read the program from the recording medium, and responsive to the program, the controller is configured to:
   obtain depth information regarding an object that is present in a real space, the depth information indicating a distribution of distances to points on a surface of the object in a depth direction relative to a predetermined position;
   develop the points on the surface of the object, within a three-dimensional space that corresponds to the real space, based on the depth information acquired by the acquisition unit;
   classify the points on the surface of the object into any of a plurality of cells of a volume grid, the plurality of cells being divided from the three-dimensional space and each cell of the plurality of cells having a predetermined size;
   determine a space in the three-dimensional space that corresponds to cells, each cell including a greater number of classified points on the surface of the object than a predetermined threshold value, as a space in which the object is present; and
   detect movement the object according to a change in the number of points on the surface of the object included in each cell of the cells of the volume grid corresponding to the space determined as a space in which the object is present.

6. An object detection method comprising:

obtaining depth information regarding an object that is present in a real space, the depth information indicating a distribution of distances to points on a surface of the object in a depth direction relative to a predetermined position;

developing the points on the surface of the object within a three-dimensional space that corresponds to the real space, based on the depth information;

classifying the points on the surface of the object into any of a plurality of cells of a volume grid, the plurality of cells being divided from the three-dimensional space and each cell of the plurality of cells having a predetermined size;

determining a space in the three-dimensional space that corresponds to cells, each cell including a greater number of classified points on the surface of the object than a predetermined threshold value, as a space in which the object is present; and detecting movement of the object according to a change in the number of points on the surface of the object included in each cell of the cells of the volume grid corresponding to the space determined as a space in which the object is present.

7. An object detection system comprising:

a measurement apparatus configured to measure, regarding an object that is present in a real space, distances to points on a surface of the object in a depth direction relative to a predetermined position; and an object detection apparatus configured to determine detection of an object that is present in the real space, based on the measured distances, wherein the object detection apparatus is configured to:

obtain depth information that indicates a distribution of the distances from the measurement apparatus to the points on the surface of the object;

develop the points on the surface of the object, within a three-dimensional space that corresponds to the real space, based on the depth information acquired by the acquisition unit;

classify the points on the surface of the object into any of a plurality of cells of a volume grid, the plurality of cells being divided from the three-dimensional space and each cell of the plurality of cells having a predetermined size;

determine a space in the three-dimensional space that corresponds to cells, each cell including a greater number of classified points on the surface of the object than a predetermined threshold value, as a space in which the object is present; and detect movement of the object according to a change in the number of points on the surface of the object included in each cell of the cells of the volume grid corresponding to the space determined as a space in which the object is present.

* * * * *